US011964856B1

(12) United States Patent
Rourk

(10) Patent No.: US 11,964,856 B1
(45) Date of Patent: Apr. 23, 2024

(54) WIRELESS PORTABLE BATTERY POWERED VEHICLE JACK

(71) Applicant: Christopher Rourk, Miami, FL (US)

(72) Inventor: Christopher Rourk, Miami, FL (US)

( * ) Notice: Subject to any disclaimer, the term of this patent is extended or adjusted under 35 U.S.C. 154(b) by 3 days.

(21) Appl. No.: 18/481,214

(22) Filed: Oct. 4, 2023

Related U.S. Application Data

(60) Provisional application No. 63/415,835, filed on Oct. 13, 2022.

(51) Int. Cl.
*B66F 3/25* (2006.01)
*B66F 3/44* (2006.01)

(52) U.S. Cl.
CPC . *B66F 3/44* (2013.01); *B66F 3/25* (2013.01)

(58) Field of Classification Search
CPC .... B66F 3/44; B66F 3/25; B66F 3/247; B66F 7/08; B66F 7/24; B66F 7/0625
See application file for complete search history.

(56) References Cited

U.S. PATENT DOCUMENTS

| | | | | | |
|---|---|---|---|---|---|
| 3,918,683 | A * | 11/1975 | Millar | B66F 3/24 206/349 |
| 4,598,898 | A * | 7/1986 | Hsu | B66F 3/44 254/93 H |
| 7,401,764 | B1 * | 7/2008 | Castillo | B66F 5/04 254/93 H |
| 8,468,749 | B1 * | 6/2013 | Dufresne | E06B 11/045 49/404 |
| 9,340,397 | B1 * | 5/2016 | Hernandez | B66F 3/247 |
| 9,676,599 | B1 * | 6/2017 | Baker | B66F 3/25 |
| 2011/0232559 | A1 * | 9/2011 | Hewitt | B63B 1/10 114/343 |
| 2013/0313040 | A1 * | 11/2013 | Cummings | B66F 11/046 182/19 |
| 2017/0088406 | A1 * | 3/2017 | Jaipaul | B66F 3/46 |
| 2018/0194602 | A1 * | 7/2018 | Helmich | B66F 3/25 |

* cited by examiner

*Primary Examiner* — Seahee Hong
(74) *Attorney, Agent, or Firm* — Ruben Alcoba, Esq.

(57) ABSTRACT

A wireless portable battery powered vehicle jack. The vehicle jack is comprised of a handle portion and a base portion that is manipulated by a pair of wheels. The handle portion comprises of an emergency stop switch, a control panel, a battery indicator, a remote control, a light, and an electric lock solenoid that is used to manipulate the handle portion. The base portion comprises of a tank, a power unit, a battery, a controller, a safety manifold, a master switch, a hydraulic ram, and a hydraulic conduit. The vehicle jack is designed to provide comfort to the user, to prevent injuries, and to minimize freak accidents.

4 Claims, 17 Drawing Sheets

WIRELESS PORTABLE BATTERY POWERED VEHICLE JACK

CROSS-REFERENCE

This application is a continuation of U.S. Provisional Patent Application Ser. No. 63/415,835 entitled "Wireless Portable Vehicle Jack", filed on Oct. 13, 2022, which is incorporated by reference herein in by its entirety.

BACKGROUND

The present invention is directed to a wireless portable battery powered vehicle jack that is battery powered.

The prior art does not disclose any wireless remote for the portable battery powered vehicle jack.

The present invention provides an automatic handle which minimizes back and wrist injuries when operating a vehicle jack.

The jack of the present invention also allows the mechanic to monitor, from a distance, the lifting of the vehicle by the jack, thereby minimizing the chances of a freak injury by the failure of the jack.

The present invention provides a safety locking hydraulic check valve that prevents the jack from lowering inadvertently to prevent injuries or freak accidents.

The jack has the ability to be connected wirelessly to the cloud through multiple systems.

The present invention measures pressure in order to send a push notification to multiple users in case of a slip off.

The present invention can be charged using a magnetic charging port. This charging port is design to be idle until the two plugs come into contact and the internal magnet activates the connection.

SUMMARY

The present invention is directed to a wireless portable battery powered vehicle jack that will prevent injuries or freak accidents.

The vehicle jack of the present invention is comprised of a handle portion, a base portion that is manipulated by a pair of wheels. The handle portion, in preferred embodiments, contains an emergency stop switch, a control panel, a battery indicator, a remote control, a light, and an electric lock solenoid that is used to manipulate the handle portion. The base portion, in preferred embodiments will contain at least a tank, a power unit, a battery, a controller, a safety manifold, a master switch, a hydraulic ram, and a hydraulic conduit.

The present invention will have a rechargeable battery. In preferred embodiments, the rechargeable battery will use a magnetic port to recharge the battery.

The handle of the present invention is locked in place via the electric lock solenoid that connects the handle to the body.

In embodiments of the present invention, the handle portion will have a light that will allow mechanics to position the jack underneath vehicles correctly in poorly lighted work areas.

Embodiments of present invention use a controller that is connected to the cloud. The Controller will notify and monitor if there is a slip when using the jack. The controller will notify a user or any third party of any danger or of any accident that is associated with the use of the jack in live time.

All embodiments of the present invention use a safety check valve that will prevent accidents that could be associated with any malfunction of the hydraulic system of the present invention.

The relief system of the present invention is an electronic relief system that can also work mechanically.

The present invention is designed to be portable. The invention does not require an air hose or wires to use, therefore restrictions due to hoses or wires are eliminated.

An object of the present invention is to provide a wireless battery powered vehicle jack that will prevent injuries.

Another object of the present invention is to provide a wireless portable vehicle jack that can be monitored from a distance.

Yet another object of the present invention is to provide a wireless portable vehicle jack that will prevent freak accidents that can occur due to the malfunction of a vehicle jack.

Yet still another object of the present invention is to provide a wireless portable vehicle jack that can be used in poorly lighted areas.

Yet a further object of the present invention is to provide a wireless portable vehicle jack that will prevent a RAM from collapsing should there be any fault in the hydraulic line system.

BRIEF DESCRIPTION OF THE DRAWINGS

These and other features, aspects, and advantages of the present invention will become better understood with regards to the following description, appended claims, and drawings where:

DESCRIPTION

Figure 1:
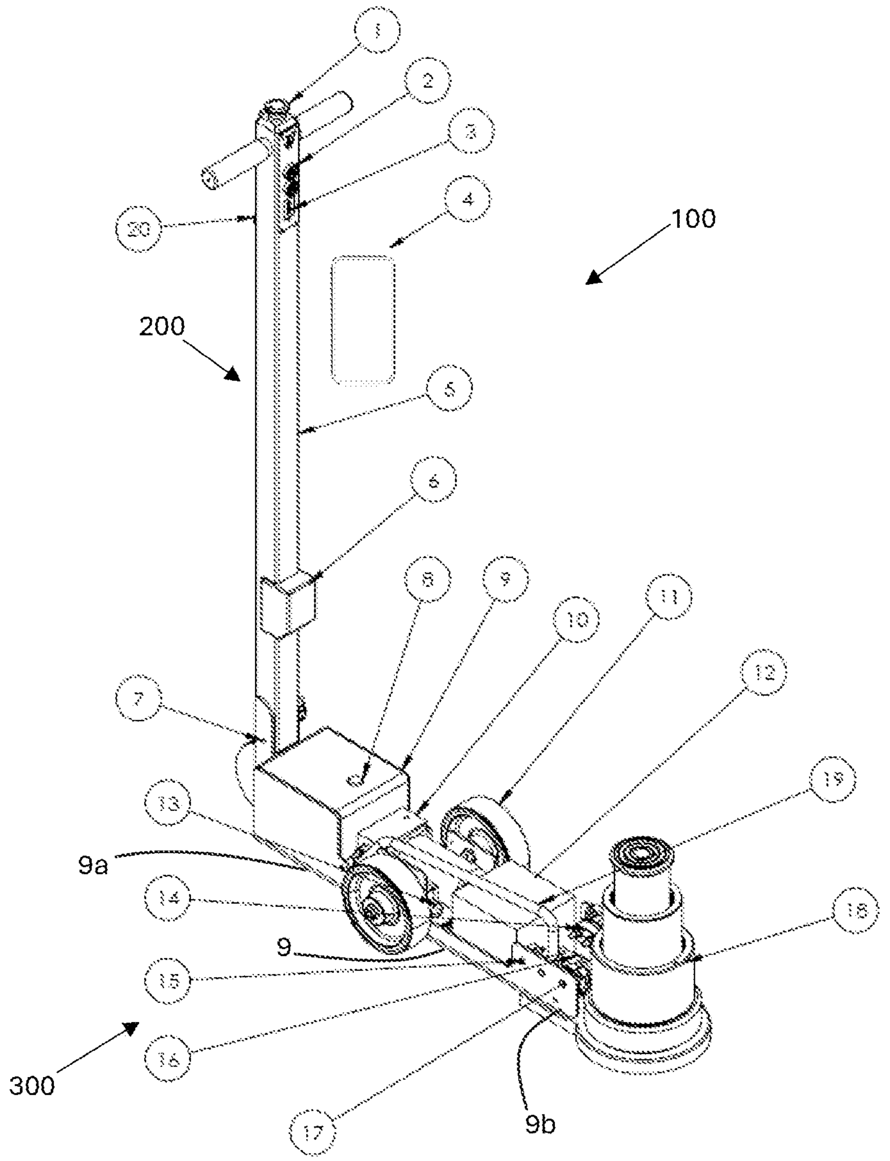
FIG. 1 shows a perspective view of a first embodiment of the present invention.
Figure 2:
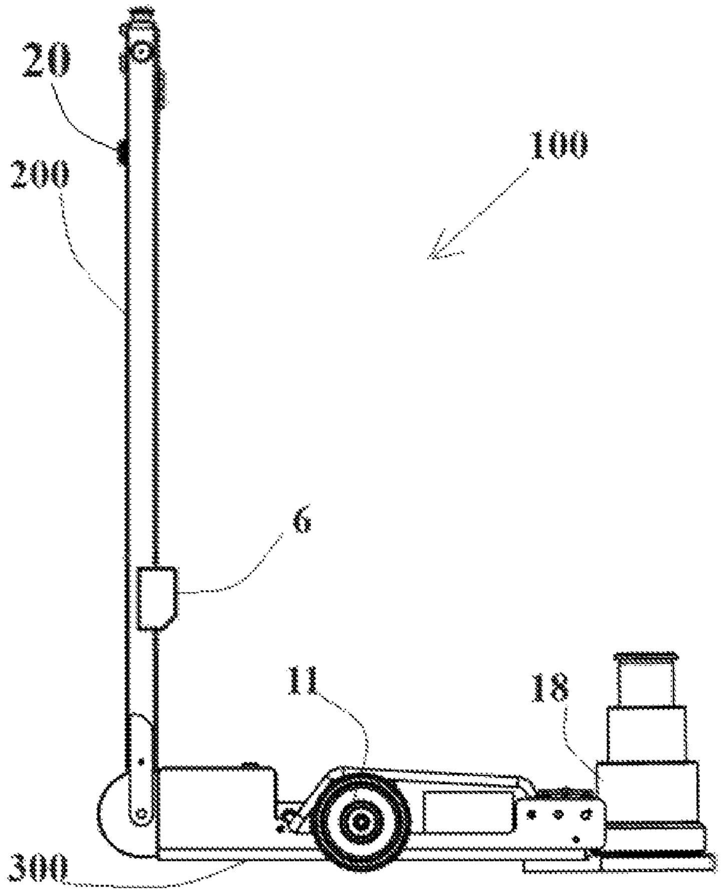
FIG. 2 shows a side view of the first embodiment of the present invention.
Figure 3:
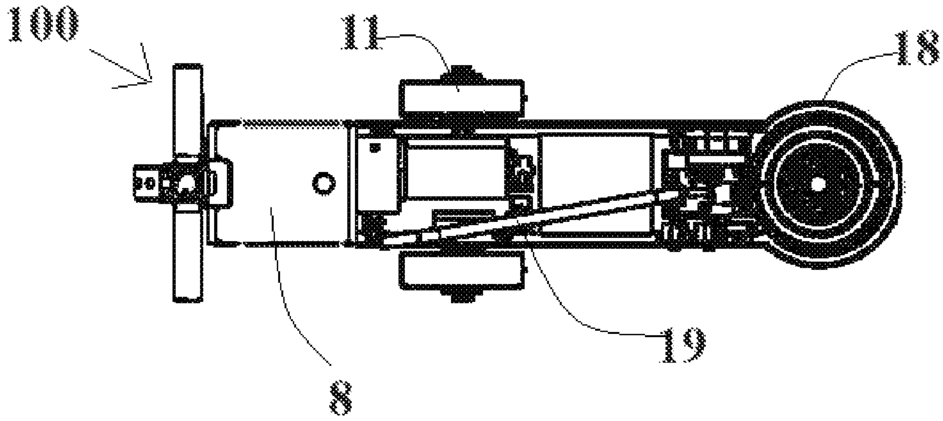
FIG. 3 shows a top plan view of the first embodiment of the present invention.
Figure 4:
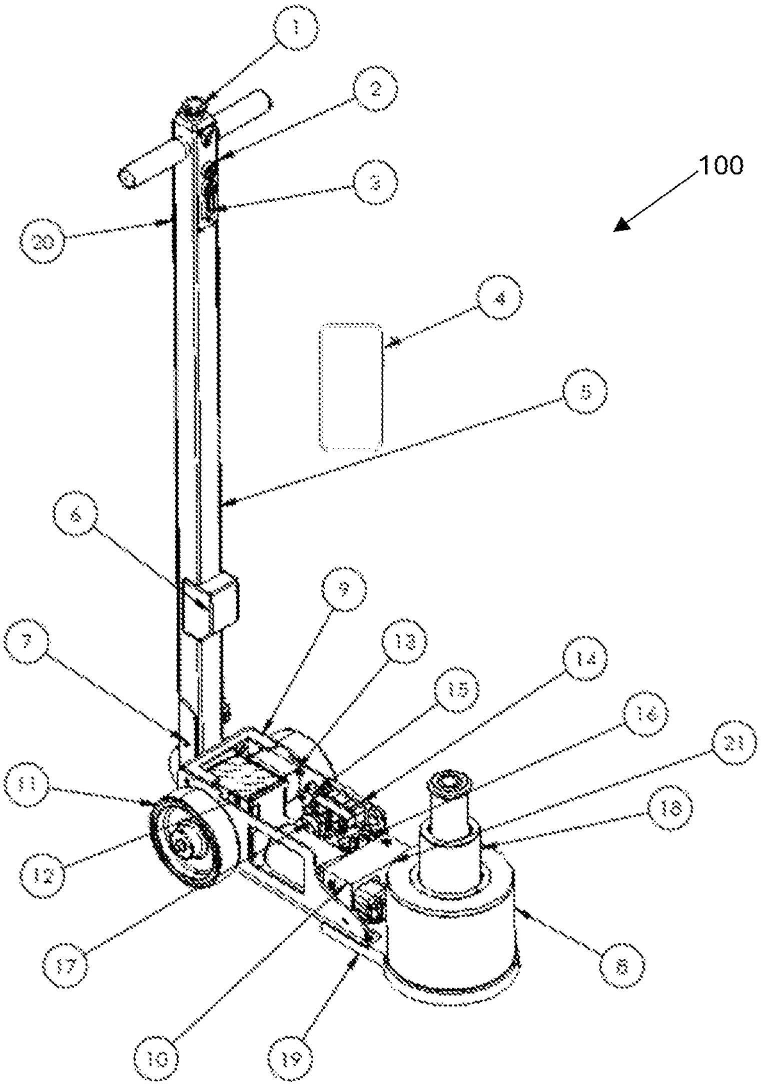
FIG. 4 shows a perspective view of a second embodiment of the present invention.
Figure 5:
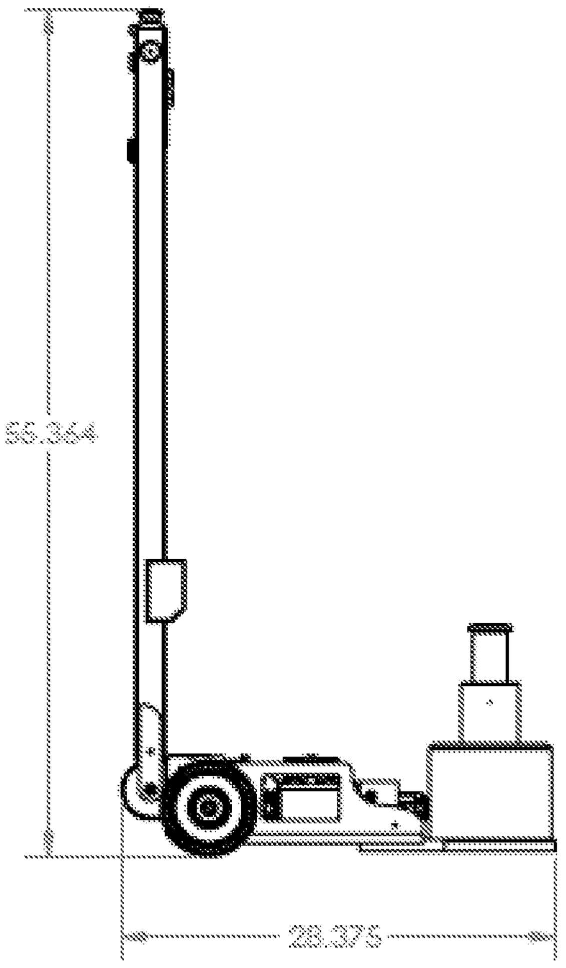
FIG. 5 shows a side view of the second embodiment of the present invention.
Figure 6:
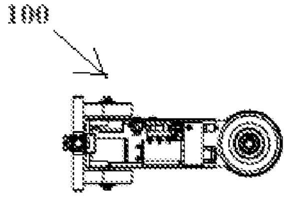
FIG. 6 shows a top plan view of the second embodiment of the present invention.
Figure 7:
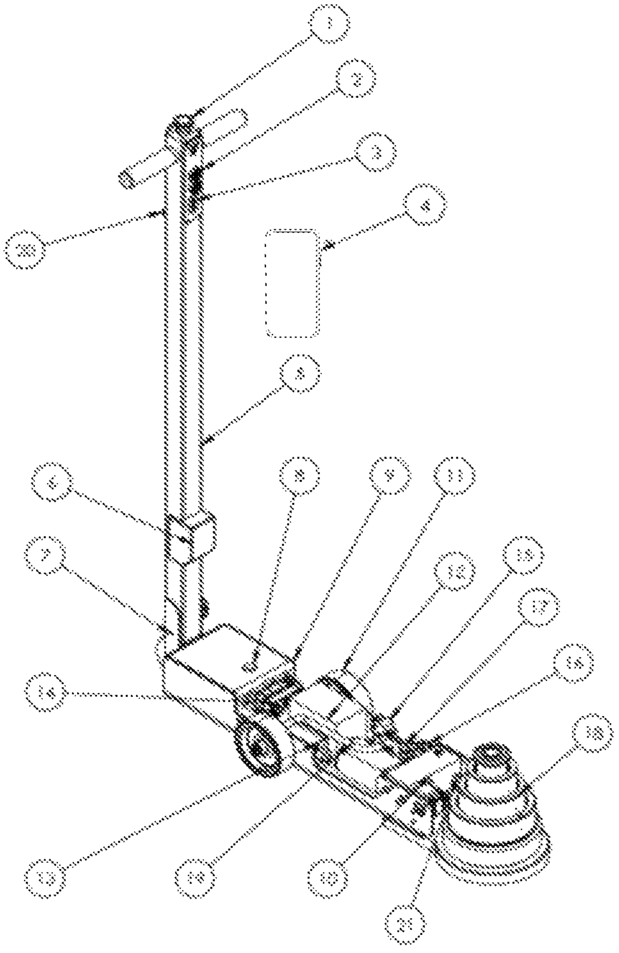
FIG. 7 shows a perspective view of a third embodiment of the present invention.
Figure 8:
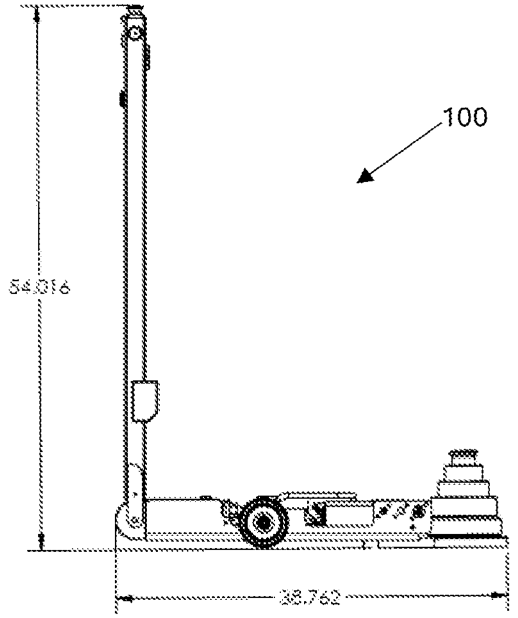
FIG. 8 shows a side view of the third embodiment of the present invention.
Figure 9:
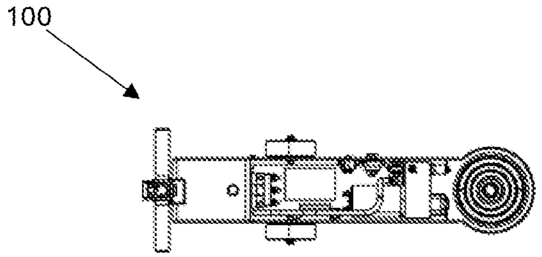
FIG. 9 shows a top plan view of the third embodiment of the present invention.
Figure 10:
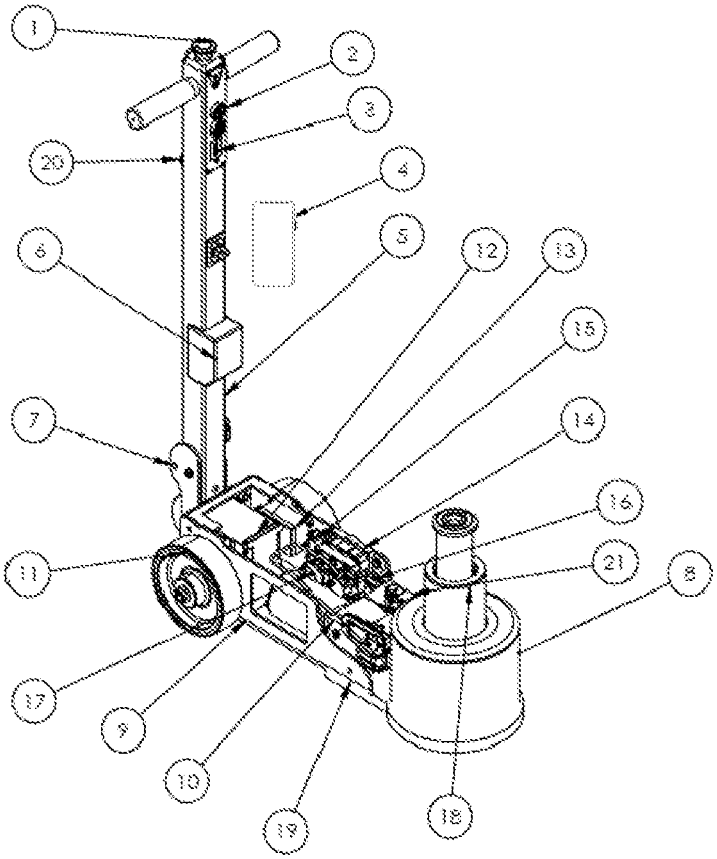
FIG. 10 shows a perspective view of a fourth embodiment of the present invention.
Figure 11:
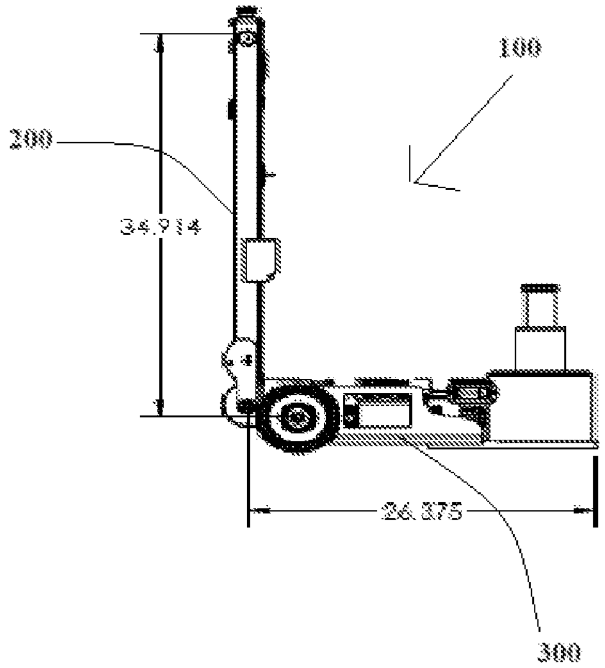
FIG. 11 shows a side view of the fourth embodiment of the present invention.
Figure 12:
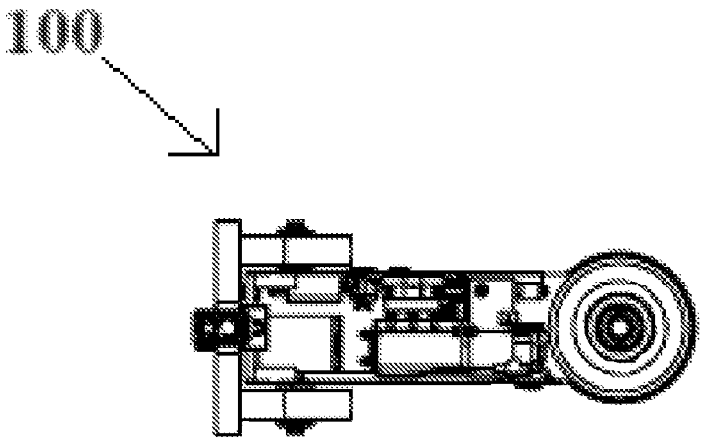
FIG. 12 shows a top plan view of the fourth embodiment of the present invention.
Figure 13:
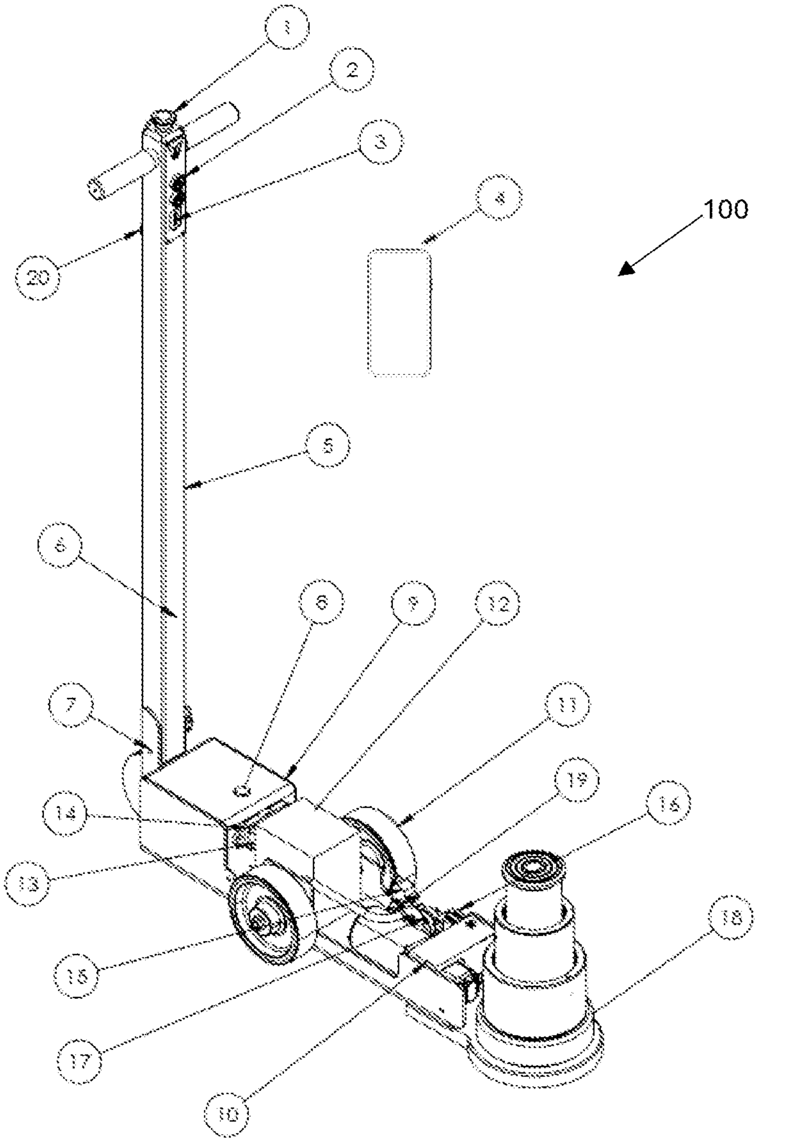
FIG. 13 shows a perspective view of a fifth embodiment of the present invention.
Figure 14:
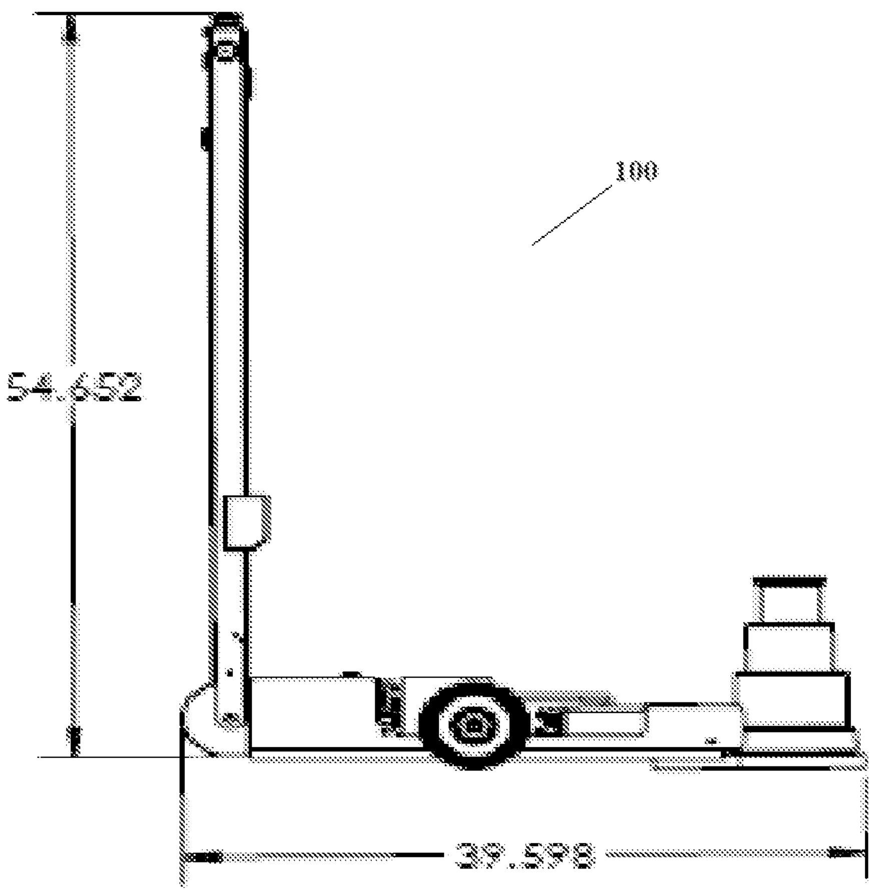
FIG. 14 shows a side view of the fifth embodiment of the present invention.
Figure 15:
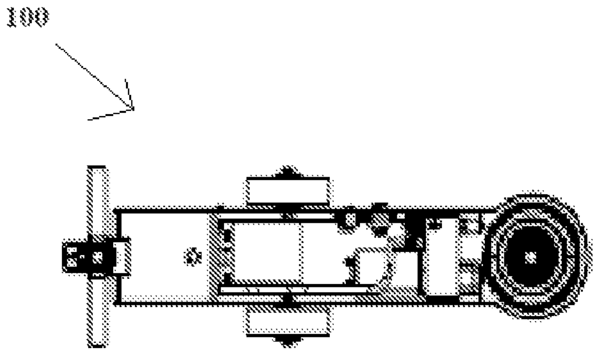
FIG. 15 shows a top plan view of the fifth embodiment of the present invention.
Figure 16:
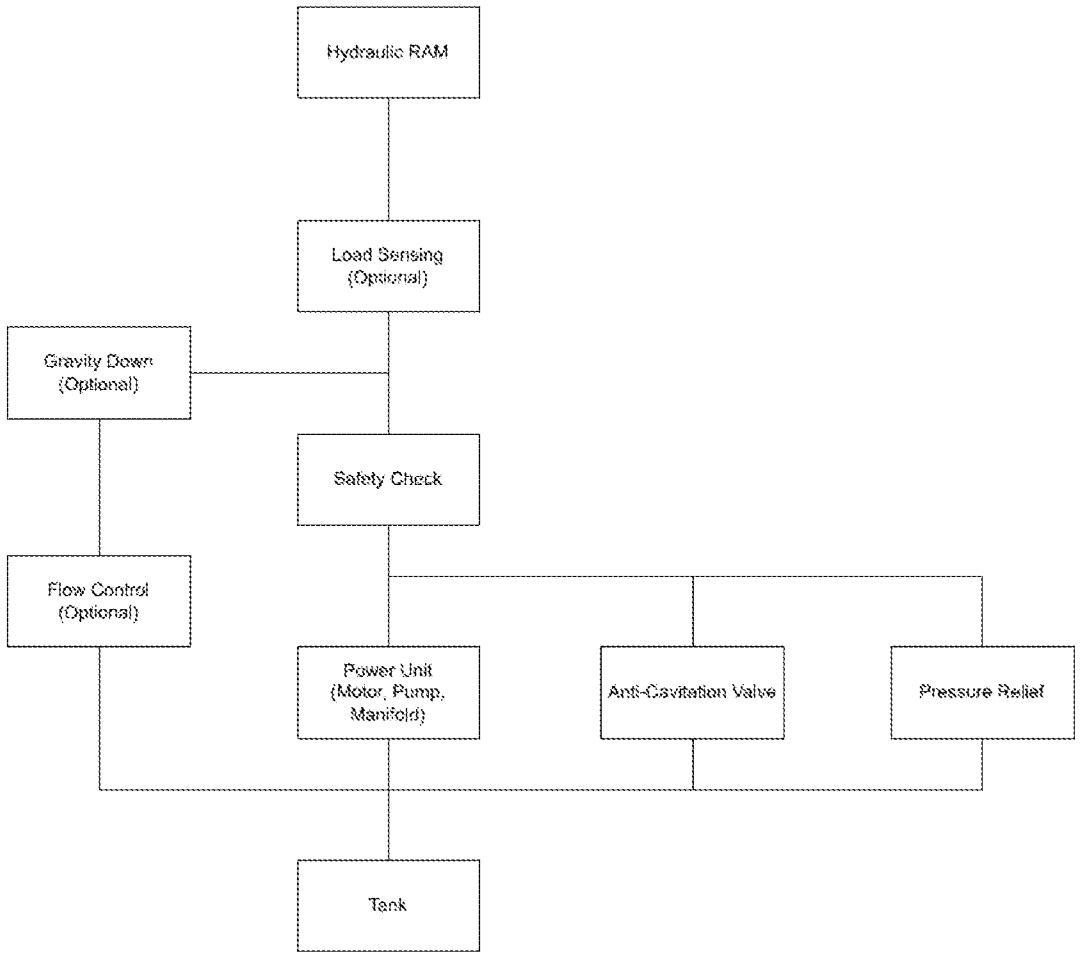
FIG. 16 is a flow diagram that shows a few of the items that are monitored by the controller and cloud when the wireless portable vehicle jack is in use.

As seen in FIGS. 1-20, the present invention is a wireless portable battery powered vehicle jack 100.

The wireless portable battery powered vehicle jack comprises 100 a handle portion 200 that comprises an emergency stop switch 1 and a control panel 2. A base portion 300 that comprises: a base 9 that has a first end 9*a* and second end 9*b*; a wheel system 11 that is mounted on the base 9 at a position that is near the first end 9*a* of the base 9; a hydraulic ram 18 that is attached to the second end 9*b* of the base 9, the hydraulic ram 18 comprises of at least one piston 30; a power unit 10 is attached to the base 9, the power unit 10 comprises of a pump 10*a*, a motor 10*b*, and a manifold system 10*c*; a tank 8 that connects to the pump 10*a*, the tank 8 is attached to the base portion 9; a hydraulic conduit 19 that connects the power unit 10 to a safety manifold 16; the safety manifold 16 that is attached to the base 9 that connects to the hydraulic ram 18; a reverse polarity DC contactor 14 that is connected to the motor 10*b* and to the safety manifold 16, the reverse polarity DC contactor 14 is attached to the base 9; a controller 13 that is configured to communicate with either a radio frequency device 4 and/or to a cloud based system 4, the controller 13 is also configured to either monitor or to be controlled by the control panel 2, the emergency stop switch 1, a rechargeable battery 12, a battery indicator 3, the electric lock solenoid 7, the motor 10*b*, the reverse polarity DC controller 14, the safety manifold 16, a circuit breaker 15, and/or the hydraulic ram 18; a rechargeable battery 12 that is configured to power the wireless portable battery powered vehicle jack 100; and a master switch 17 that is connected to the battery 12, the master switch 17 is configured to either supply power or to shut off power to the wireless portable battery powered vehicle jack 100. And, the electric lock solenoid 7 that connects the handle portion 200 to the base portion.

In embodiments of the present invention, the handle portion comprises a battery indicator 3 that is connected to the rechargeable battery 12.

In another embodiment of the present invention, the handle portion 200 comprises a magnetic port charging receiver 20 that is connected to the rechargeable battery 12.

In a further embodiment of the present invention, the base portion 9 comprises a circuit breaker system 15 that is configured to cut off the flow of electricity from the battery 12, the circuit breaker system 15 is connected to the controller 13, the motor 10*b*, the magnetic port charging receiver 20, and the battery 12.

In an embodiment of the present invention, the tank 8 is positioned at a position that is adjacent to the first end 9*a* of the base 9. In another embodiment of the present invention, the tank 8 is attached to the hydraulic ram 18.

In preferred embodiments, the safety manifold 16 has a check valve 17. The check valve 17 prevents hydraulic fluid from escaping the hydraulic ram 18.

Figure 17:
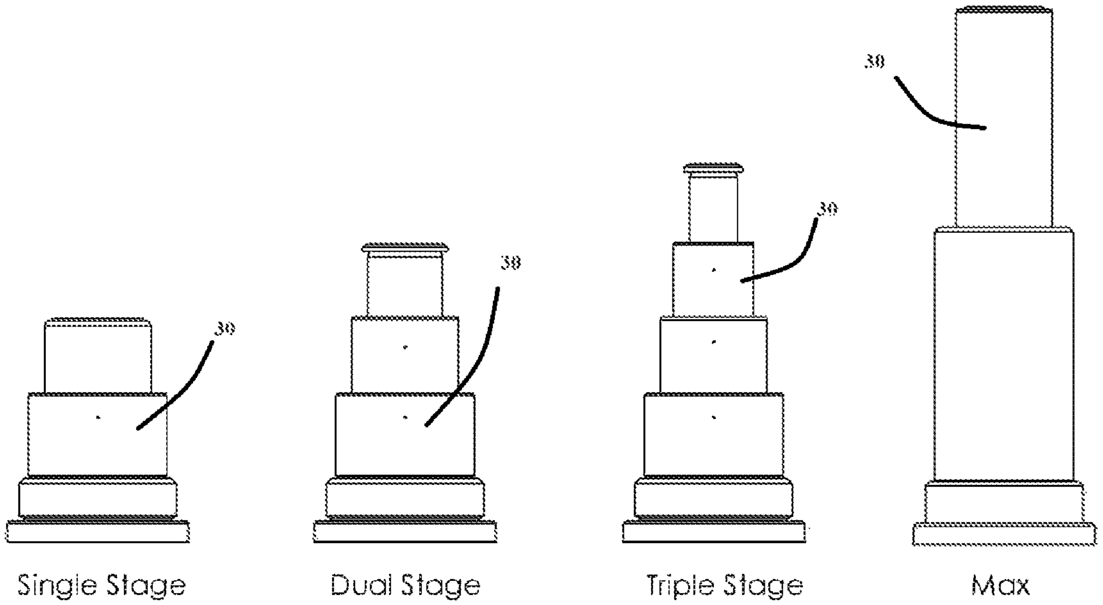
FIG. 17 is a front view of four different hydraulic rams that are used with the present invention.
Figure 18:
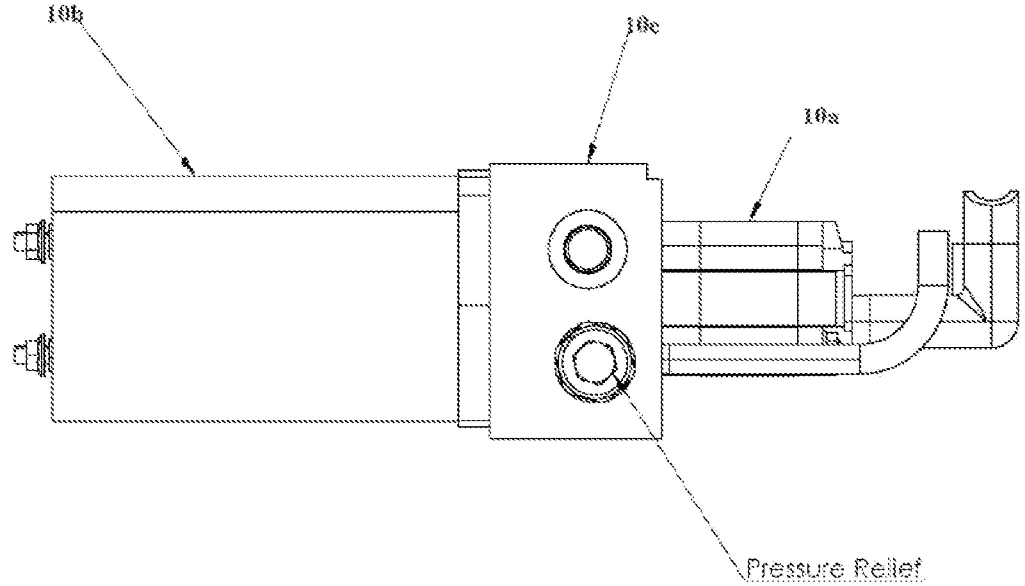
FIG. 18 shows a pictorial diagram of the elements of the power unit.
Figure 19:
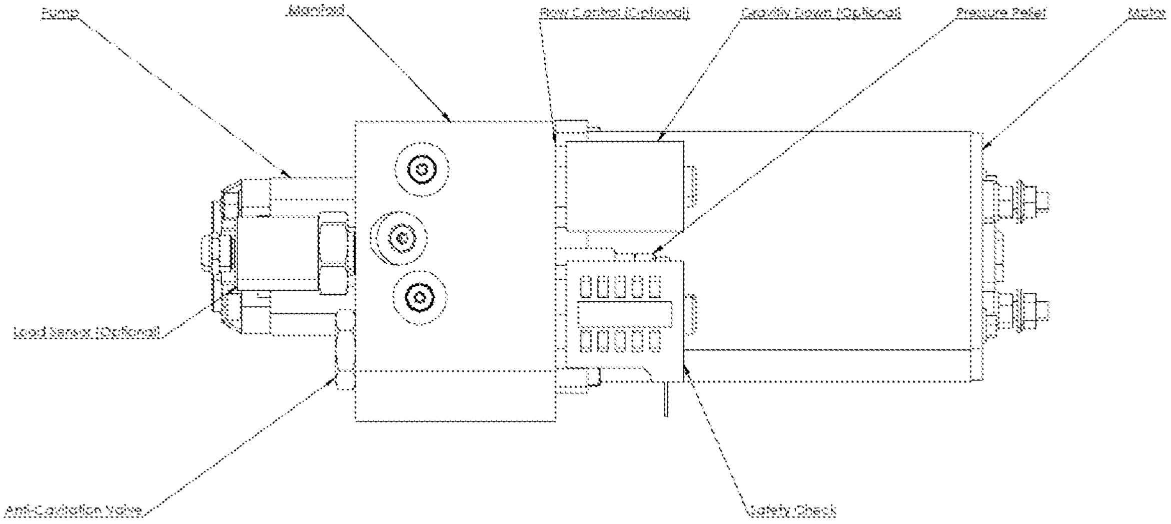
FIG. 19 shows a preferred embodiment of the power unit of the present invention.
Figure 20:
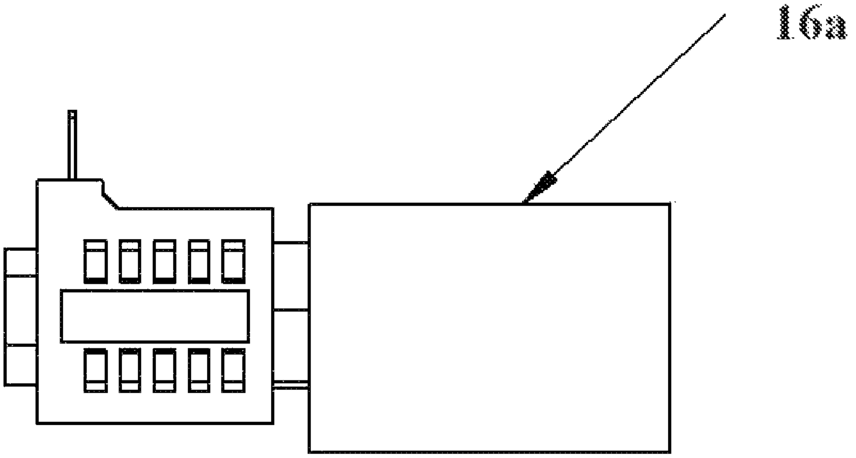
FIG. 20 shows a representation of the safety manifold and the check valve.

As seen in FIG. 17, the hydraulic ram 18 of the present invention can have one, two, three, or four pistons 30.

In still a further embodiment of the present invention, the handle portion 200 has a light 6.

An advantage of the present invention is that it provides a wireless battery powered vehicle jack that prevents injuries.

Another advantage of the present invention is that it provides a wireless portable vehicle jack that is monitored from a distance.

Yet another advantage of the present invention is that it provides a wireless portable vehicle jack that prevents freak accidents from occurring that are due to malfunctions of a vehicle jack.

Yet still another advantage of the present invention is that it provides a wireless portable vehicle jack that is used in poorly lighted areas.

Yet a further advantage of the present invention is that it provides a wireless portable vehicle jack that prevents a RAM from collapsing when faults occur in the hydraulic line system.

While the inventor's description contains many specificities, these should not be construed as limitations of the wireless portable vehicle jack of the present invention, but rather as an exemplification of several preferred embodiments thereof, any other variations may be possible. Accordingly, the scope should be determined not by the embodiments illustrated, but by the specification, the drawings, and the claims and any legal equivalent thereof.

What is claimed is:

1. A wireless portable battery powered vehicle jack that will prevent back injuries or freak accidents, the wireless portable battery powered vehicle jack comprises:

- a handle portion that comprises an emergency stop switch and a control panel;
- a base portion that comprises:
  - a base that has a first end and a second end;
  - a wheel system that is mounted on the base at a position that is near the first end of the base;
  - a hydraulic ram that is attached to the second end of the base, the hydraulic ram comprises of at least one piston;
  - a power unit is attached to the base, the power unit comprises of a pump, a motor, and a manifold system;
  - a tank that connects to the pump, the tank is attached to the base portion;
  - a hydraulic conduit that connects the power unit to a safety manifold;
  - the safety manifold that is attached to the base that connects to the hydraulic ram;
  - a reverse polarity DC contactor that is connected to the motor and to the safety manifold, the reverse polarity DC contactor is attached to the base;
  - a controller that is configured to communicate with either a radio frequency device or to a cloud based system, the controller is also configured to either monitor or to be controlled by the control panel, the emergency stop switch, a rechargeable battery, a battery indicator, an electric lock solenoid, the motor, the reverse polarity DC controller, the safety manifold, a circuit breaker, or the hydraulic ram;
  - the rechargeable battery that is configured to power the wireless portable battery powered vehicle jack; and
  - a master switch that is connected to the battery, the master switch is configured to either supply power or to shut off power to the wireless portable battery powered vehicle jack;
  - the electric lock solenoid that connects the handle portion to the base portion;

wherein the handle portion comprises a battery indicator that is connected to the rechargeable battery; and wherein the handle portion comprises a magnetic port charging receiver that is connected to the rechargeable battery.

2. The wireless portable battery powered vehicle jack that prevents back injuries or freak accidents of claim 1, wherein the base portion comprises a circuit breaker system that is configured to cut off the flow of electricity from the rechargeable battery, the circuit breaker is connected to the controller, the motor, the magnetic port charging receiver, and the rechargeable battery.

3. The wireless portable battery powered vehicle jack that prevents back injuries or freak accidents of claim 2, wherein the tank is positioned at a position that is adjacent to the first end of the base.

4. The wireless portable battery powered vehicle jack that prevents back injuries or freak accidents of claim 2, wherein the tank is attached to the hydraulic ram.

* * * * *